Nov. 5, 1963  A. P. SMITH  3,109,465

SAW GUIDE ASSEMBLIES

Filed May 19, 1961

INVENTOR

ALBERT P. SMITH

BY

ATTORNEYS 3,109,465
SAW GUIDE ASSEMBLIES
Albert P. Smith, Mountain Grove, Mo., assignor to Sure Hit Products Inc., Mountain Grove, Mo., a corporation of Missouri
Filed May 19, 1961, Ser. No. 111,328
2 Claims. (Cl. 143—162)

This invention relates to saw guide assemblies, and more particularly to such assemblies adapted for use with saw apparatus of the type incorporating a vertically moving elongated saw blade.

Various types of guide and/or support devices have heretofore been suggested for use with band saws having elongated continuous belt-type saw blades and jig saws having elongated reciprocally movable saw blades. While some of such devices have improved the operating characteristics of the apparatus with which they are used, the art has remained in search of a saw guide which not only maintains the saw blade in operative position, but also prevents undercutting, fuzzy cuts and/or "blade pinch."

Accordingly, one of the primary objects of the present invention is to provide an improved saw blade guide, which guide is adapted to support the saw blade whereby straight or contour lines can be cut in a workpiece to exact measurement without undercutting, fuzzy cutting, or blade pinching.

A still further, yet more specific primary object of the present invention is to provide an improved saw guide and support device, which device can be readily attached to existing equipment to maintain the saw blade with the teeth thereof along a given line at any time regardless of the angle through which the saw blade may be turned.

Yet other, still further, and more specific objects of the present invention are: (a) to provide an improved saw blade support and guide device conforming with the preceding objects, which device is adapted to be supported on the guide posts normally incorporated in a sawing apparatus; (b) to provide such a device wherein the saw blade engaging and supporting components thereof are movable pivotally with respect to the path of movement of the saw blade whereby such components maintain the teeth of the blade in the center of a predetermined fixed pivot circle; (c) to provide such a device which incorporate a first plate member adapted to be fixed to the standard support post, and a second plate carrying the blade engaging components thereon, which second plate is pivotally secured with respect to the first plate so as to be swingably movable about the longitudinal axis of the saw blade being supported; (d) to provide such a device which is adjustable to accommodate blades of differing widths and depths; and (e) to provide such a device which is inexpensively manufactured, and formed from available and readily fabricated components.

In its simplest and broadest aspects, the invention provides a device for supporting an elongated and vertically movable saw blade to maintain the teeth thereof along a given line, and prevent undercutting thereby of a workpiece, which device comprises a base member, means for supporting the base member for horizontal pivot movement with respect to the path of movement of the saw blade, and means carried by the base member and pivotally movable therewith for engaging and supporting the saw blade to maintain the forward edge along a given line regardless of the angle of turn of the saw blade. Certain constructional combinations and configurations constitute important features of the invention, as explained below.

The invention will be better understood, and objects other than those specifically set forth above will become apparent, when consideration is given to the following detailed description. Such description refers to the annexed drawings presenting the preferred and illustrative embodiments of the invention. In the drawings.

Figures 1, 2, 3:
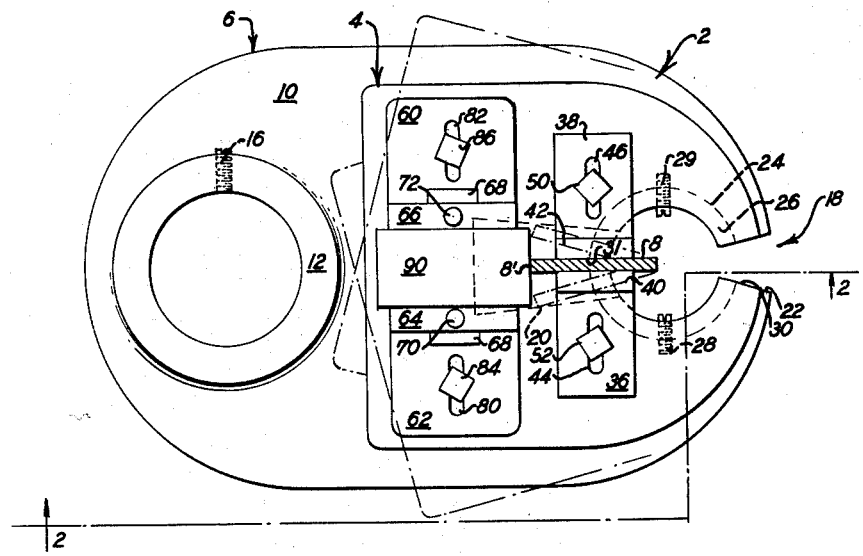
FIGURE 1 is a top plan view of a saw blade guide and supporting device constructed in accordance with the present invention.
FIGURE 2 is a side elevational view partially in section, of the device shown in FIGURE 1, FIGURE 2 presenting the components thereof as the same would appear when supported on a conventional guide post.
FIGURE 3 is a reduced plan view of the preferred form of base member incorporated for supporting the saw engaging components of the assembly provided by the invention.

In the drawings, the blade support and guide device provided by the invention is generally designated by the numeral 2 and is shown as comprising a base member 4, means generally designated by the numeral 6 for supporting the base member for horizontal pivotal movement with respect to the path of movement of the saw blade 8, and means carried by the base member 4 and pivotally movable therewith for engaging and supporting the saw blade.

The means 6 for supporting the base member for horizontal pivotal movement, comprises, in accordance with the preferred embodiment of the invention, a first supporting plate member 10 having a collar 12 projecting upwardly from one end thereof. The collar 12, preferably formed integrally with base plate 10, is adapted, as shown in FIGURE 2, to surround the normal guide post 14 provided on a band saw apparatus, for example. The collar 12 is provided with a suitable threaded aperture with which a set screw 16 cooperates. With this construction, the set screw, upon tightening thereof, fixes the plate member 10 to post 14. The first plate member 10, in addition to carrying the collar, is provided with an opening or slot therein generally designated by the numeral 18. The rear portion of this slot 18, shown in dotted lines in FIGURE 1, takes the form of a dovetail generally designated by the numeral 20. The central forward portion of the slot 18 in plate member 10 is defined by a tapering entrance 22 which is separated from the dovetail opening 20 by a circular opening 24.

The base plate 4, as shown in FIGURE 2, is a separate or second plate member which carries adjacent the forward end thereof a bearing collar 26 adapted to pass through the circular opening 24 in the first plate member 10. The bearing collar 26 has suitable apertures in the sides thereof whereby pins 28 and 29 may be passed therethrough to extend laterally of the opening 24 and support the plate 4 pivotally on the first support plate member 10. As shown in FIGURE 3, the collar 26 is open at opposite ends thereof, and the base member 4 is provided (a) with an entrance 30 which registers with the entrance 22 in the first plate member 10, and (b) with a rear slot 31 which normally extends above dovetail opening 20 in the first plate member 10.

As best shown in FIGURE 1, the saw blade 8 may be passed through the registering openings 22 and 30 in the first and second plate members 10 and 4 respectively and through the openings in the collar 26 and corresponding opening 24 in the lower plate member 10 so as to assume the position shown in FIGURE 1. Of course, in operative position the blade passes through slot 31 in base plate 4 and dovetail opening 20 in the support plate 10.

The base member or second plate member 4 carries on the upper face thereof two right angle bracket members 36 and 38 which are disposed on opposite sides of the opening 31 in the plate member 4, which opening, as suggested, registers with the dovetail opening 20 in the first plate member 10. The dovetail opening permits turning movement of the blade therein, as explained in more detail below.

The brackets 36 and 38 disposed on opposite sides of slot 31 have upstanding legs 40 and 42 respectively which define therebetween a blade receiving passageway. The horizontal legs of the brackets 36 and 38 are provided with slot openings 44 and 46 respectively through which pass suitable cap screws 50 and 52. The cap screws cooperatively engage threaded bores 51 and 53 (FIGURE 3) provided in the plate 4 whereby the cap screws may be tightened down to maintain the brackets in desired position, or loosened to permit for adjustment of the brackets.

The plate 4 carries two additional bracket members 60 and 62. The upstanding legs 64 and 66 respectively of such brackets are provided with suitable bearing apertures adapted to receive a shaft 68 extending therebetween. Each of the upstanding legs 64 and 66 is, in addition, provided with a vertical bore extending into the bearing apertures. The bores are adapted to receive the set screws 70 and 72 which may be tightened down on the shaft to maintain the same fixed between the brackets 60 and 62.

The horizontal legs of the brackets 60 and 62 are provided with slots 80 and 82 which permit adjustment of the brackets under the cap screws 84 and 86 which are provided for locking or fixing of the brackets 60 and 62 to the plate 4. Suitable threaded apertures 83 and 85 (FIGURE 3) are provided in the plate 4 to receive the threaded ends of the cap screws 84 and 86.

The shaft 68 carries a roller 90 which is positioned so that the rear edge 8′ of the blade 8 engages the periphery thereof. This roller 90 serves to support the blade with the forward or "teeth edge" thereof always along a given line, or at the center of a fixed pivot circle.

In operation, the saw blade 8 passes between the upstanding legs 40 and 42 of the brackets 36 and 38, through the openings in the respective plates 4 and 10, and the rear edge of the blade engages the periphery of the roller 90. When the workpiece is pressed against the blade, and it is desired to cut straight, the components occupy the solid line position shown in FIGURE 1. However, assuming it is desired to make a contour cut, then the blade twists slightly to assume the dotted line position shown in FIGURE 1. With this twisting, the plate 4 pivots in the direction in which the blade is twisting and assumes the dotted line position also shown in FIGURE 1. Thus, as a workpiece is fed into the saw, the teeth of the saw are always in the center of a defined pivot circle regardless of the angle through which the saw blade is turned. The roller backs up the saw blade to keep the teeth centered in perfect alignment with the line of cut. Because of the aforesaid support of the saw blade, there is no undercutting of the workpiece, and by virtue of the provision of the roller, there is no blade pinching.

It should be apparent that the provision of dovetail opening 20 permits turning of the saw blade 8 to the positions shown in phantom in FIGURE 1. The slot 31 receives the blade, but need not permit turning of the blade therein, because the slot 31, and plate member 4 pivot with turning of the blade.

The base plate 4 is smaller than support plate 10 so as to allow for pivoting without interference from collar 12. Moreover, the pivotal coupling of base plate 4 with support plate 10 is provided at the forward end thereof, in aligned spaced relation to collar 12, so that the rear end of plate 4 is permitted to swing through a substantial angle.

While the construction shown in the drawings is the preferred embodiment of the present invention, it will be understood that various modifications can be made thereto without departing from the scope and spirit of the invention. At the same time, it will be understood, after reading the foregoing detailed description of the invention, that the objects set forth at the outset of this specification have been successfully achieved. Accordingly, what is claimed is:

1. For use with a saw apparatus having an elongated saw blade movable in a vertical path, and a support post extending parallel to the path of movement of the blade, a blade guide device comprising a first horizontal support plate member adapted to be fixed to the support post, said first plate member having a first blade receiving slot therein, a second support plate member pivotally mounted on said first plate member for horizontal movement with respect thereto, said second plate member having a second blade receiving slot therein registering with said first blade receiving slot, a pair of brackets carried on said second plate member on opposite sides of said second slot, said brackets defining a blade receiving passageway therebetween, said passageway registering with said slots, and a blade engaging roller carried on said second plate member, said roller being disposed with the periphery thereof vertically aligned with said slots whereby the rear edge of a blade extending through said passageway engages said roller, said brackets being adjustable with respect to one another whereby the width and position of said passageway can be changed, said first plate member being provided with a circular opening therein positioned to be spaced from the post when said first plate member is fixed to the post, said second plate member carrying a depending bearing member rotatable in said opening, said bearing member extending below said first plate member, and said bearing member carrying at least one pin extending horizontally below said first plate member to maintain said second plate member on said first plate member.

2. A blade guide device as defined in claim 1 wherein said first blade receiving slot is of dovetail shape, and wherein said second blade receiving slot is elongate and substantially narrower than said first blade receiving slot.

References Cited in the file of this patent

UNITED STATES PATENTS

| | | |
|---|---|---|
| 1,783,330 | Edwards | Dec. 2, 1930 |
| 2,705,510 | Stocke | Apr. 5, 1955 |
| 2,782,811 | Johnson | Feb. 26, 1957 |